United States Patent
Michler et al.

(10) Patent No.: US 8,490,772 B2
(45) Date of Patent: Jul. 23, 2013

(54) HIGH SPEED INTERFOLDED LOG ACCUMULATOR

(75) Inventors: James R. Michler, Ashland, WI (US); Thomas W. Schneider, Grand View, WI (US)

(73) Assignee: C. G. Bretting Manufacturing Co., Inc., Ashland, WI (US)

( * ) Notice: Subject to any disclaimer, the term of this patent is extended or adjusted under 35 U.S.C. 154(b) by 419 days.

(21) Appl. No.: 12/980,072

(22) Filed: Dec. 28, 2010

(65) Prior Publication Data

US 2012/0163944 A1 Jun. 28, 2012

(51) Int. Cl.
*B65G 1/00* (2006.01)

(52) U.S. Cl.
USPC .................. 198/347.1; 198/435; 198/705

(58) Field of Classification Search
USPC ............... 198/347.1, 703, 705, 712, 799, 435
See application file for complete search history.

(56) References Cited

U.S. PATENT DOCUMENTS

| | | | | |
|---|---|---|---|---|
| 1,901,928 A | * | 3/1933 | Olson | 198/463.2 |
| 2,734,617 A | * | 2/1956 | Temple | 198/427 |
| 3,093,233 A | * | 6/1963 | Klenk | 198/432 |
| 3,301,111 A | | 1/1967 | Nystrand | |
| 3,762,582 A | | 10/1973 | Barnhart et al. | |
| 3,845,948 A | | 11/1974 | Furbeck et al. | |
| 3,954,165 A | * | 5/1976 | Snyder | 198/418.4 |
| 4,037,525 A | | 7/1977 | Sjogren et al. | |
| 4,061,325 A | | 12/1977 | Marcalus et al. | |
| 4,142,626 A | | 3/1979 | Bradley | |
| 4,383,600 A | | 5/1983 | Southerling et al. | |
| 4,700,939 A | | 10/1987 | Hathaway | |
| 4,721,295 A | | 1/1988 | Hathaway | |
| 4,770,287 A | | 9/1988 | Glowatski | |
| 4,770,402 A | | 9/1988 | Couturier | |
| 4,989,722 A | * | 2/1991 | Kuepper | 198/475.1 |
| 5,018,334 A | * | 5/1991 | Guttinger et al. | 53/152 |
| 5,299,793 A | | 4/1994 | Couturier | |
| 5,339,942 A | * | 8/1994 | Gasser et al. | 198/347.1 |
| 5,543,699 A | * | 8/1996 | Schoeneck | 318/616 |
| 5,735,380 A | * | 4/1998 | Schneider et al. | 198/347.1 |
| 5,960,927 A | * | 10/1999 | Bahr | 198/347.1 |
| 6,053,304 A | | 4/2000 | Biagiotti | |
| 6,182,418 B1 | | 2/2001 | McFarland | |
| 6,352,251 B1 | | 3/2002 | De Angelis | |
| 6,565,500 B1 | | 5/2003 | Hailey et al. | |
| 6,640,960 B1 | * | 11/2003 | Spettl | 198/347.1 |
| 6,712,746 B1 | | 3/2004 | White | |
| 6,758,321 B2 | * | 7/2004 | Spettl | 198/347.1 |

(Continued)

FOREIGN PATENT DOCUMENTS

EP 0 865 918 A1 9/1998
WO WO 2007/073244 A1 6/2007

*Primary Examiner* — Gene Crawford
*Assistant Examiner* — Keith R Campbell
(74) *Attorney, Agent, or Firm* — Reinhart Boerner Van Deuren P.C.

(57) ABSTRACT

A log accumulator comprising a plurality of buckets, a feed arrangement and a transport system and methods are provided. The feed arrangement loads logs onto the buckets. The transport system transports the buckets past the feed arrangement for loading of the buckets. The transport system and the feed arrangement are configured to maintain the feed arrangement in a fixed relative position with one of the buckets for an extended period of time while the feed arrangement loads the one of the buckets. The accumulator may include an unload arrangement that operates to unload logs in substantially the same manner as the feed arrangement.

29 Claims, 7 Drawing Sheets

U.S. PATENT DOCUMENTS

| | | |
|---|---|---|
| 6,820,397 B2 | 11/2004 | Haasl |
| 6,840,368 B2 | 1/2005 | Betti et al. |
| 6,880,314 B2 | 4/2005 | Haasl |
| 7,178,658 B2 * | 2/2007 | Philipp ............... 198/347.1 |
| 7,197,862 B2 | 4/2007 | Daoust et al. |
| 7,258,221 B2 | 8/2007 | Di Nardo et al. |
| 7,470,102 B2 | 12/2008 | Gendron et al. |
| 8,011,492 B2 * | 9/2011 | Davi et al. ............ 198/347.1 |
| 8,342,311 B2 * | 1/2013 | Philipp ............... 198/345.1 |

* cited by examiner

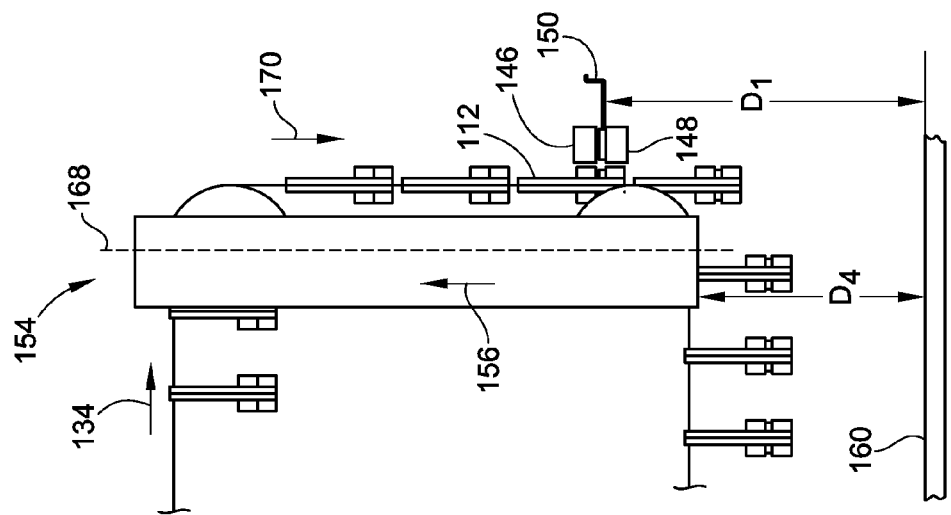
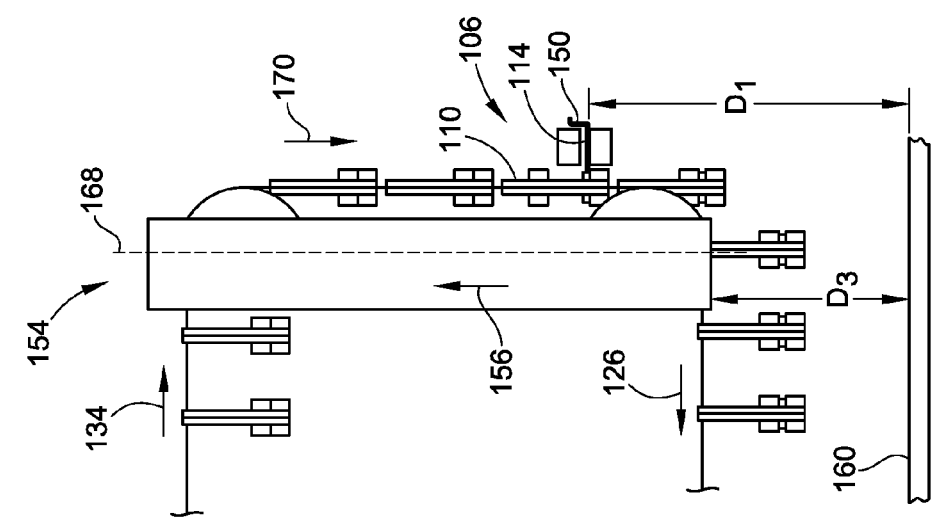
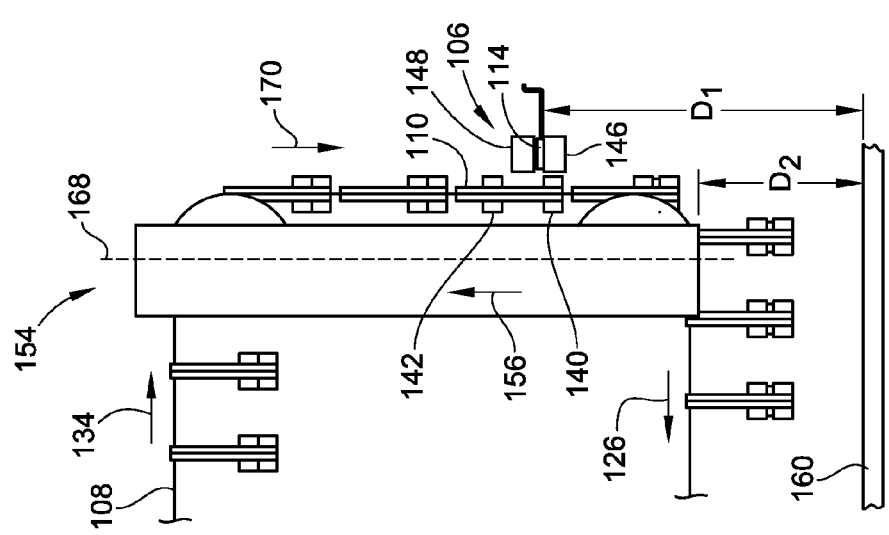

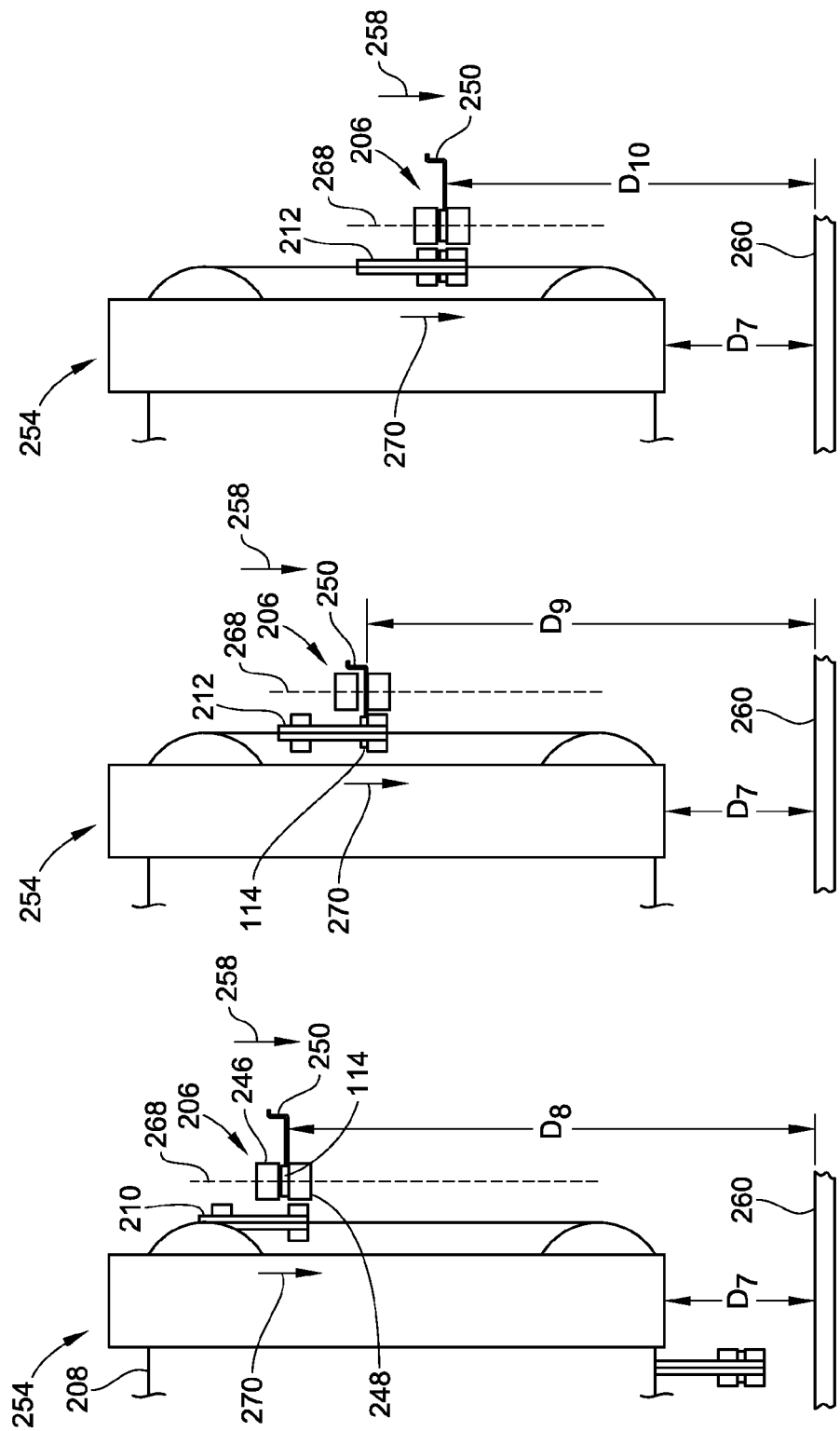

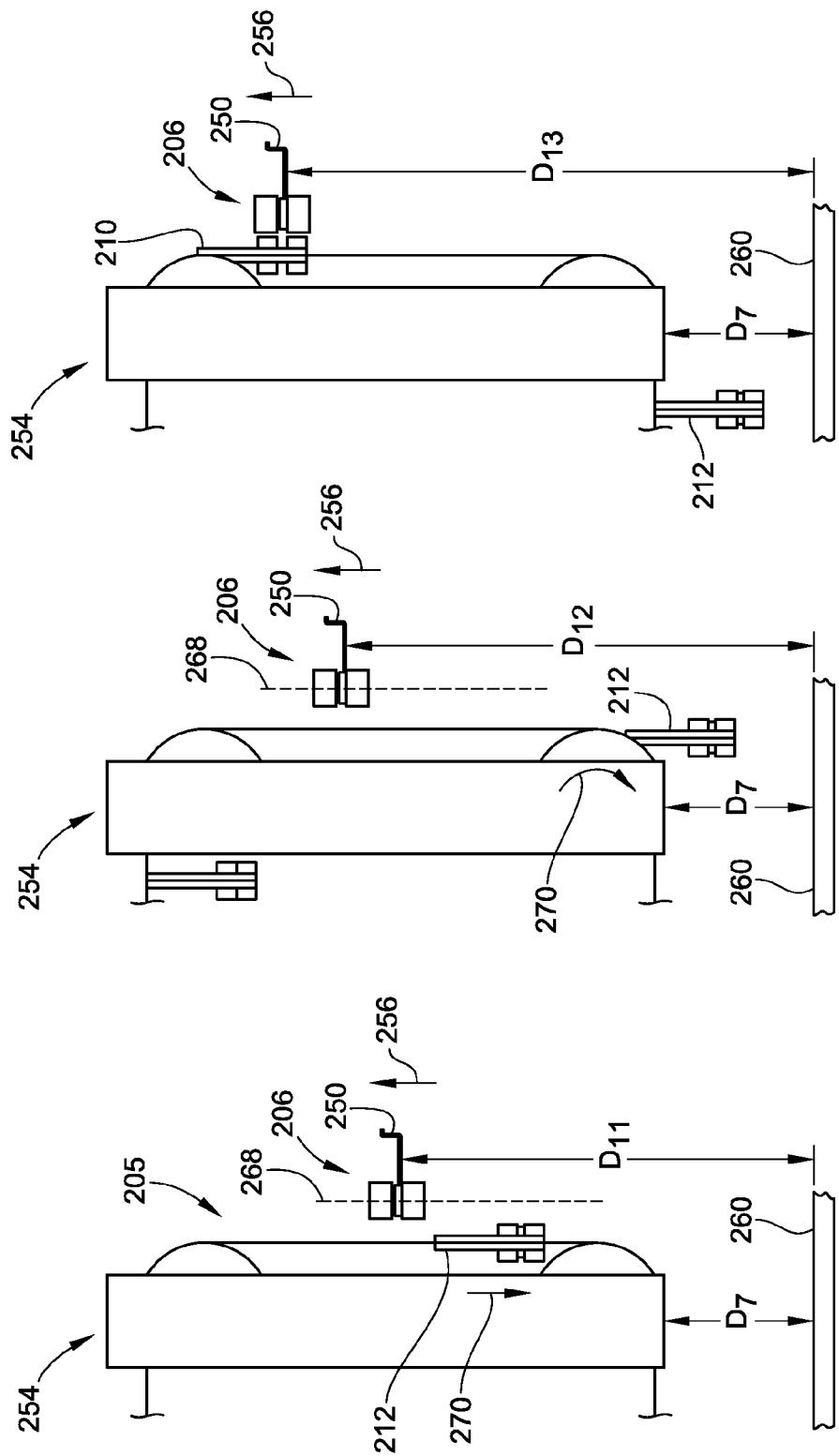

HIGH SPEED INTERFOLDED LOG ACCUMULATOR

FIELD OF THE INVENTION

This invention generally relates to an accumulator for temporarily storing and accumulating logs of elongated product, such as logs of paper products such as paper towels or facial tissues. More specifically, although not exclusively, the invention relates to an accumulator for storing and accumulating logs of elongated rolls or stacks of products such as paper, paper towels, facial tissues and the like.

BACKGROUND OF THE INVENTION

Accumulators are used in manufacturing systems, and particularly paper processing systems, to store elongated logs of product that have been formed into elongated rolls or stacks prior to being reduced in length for commercial packaging. For example, during formation of interfolded paper towels, the paper towels are initially formed into an elongated stack of interfolded paper towels that can be in excess of eight feet long. This log is then passed to downstream processing systems to be sawed into shorter lengths, such as twelve (12) to eighteen (18) inch lengths for example. These shorter lengths are then packaged for consumer use.

The accumulators store the logs as they are dispensed from the system that forms the logs in the event that there is a breakdown, scheduled maintenance, or other downtime experienced by either the upstream or a downstream system. The accumulator allows the other system that is not experiencing downtime to continue to operate. This can be very beneficial in the event that either system needs to run continuously to avoid long reset or startup time.

One problem particularly occurs with the use of rectangular logs of stacked paper. These logs do not roll. As such, they have to be slid laterally into buckets of the accumulator by a feed arrangement. The feed arrangement includes a pusher element that pushes the logs laterally into the buckets in a direction that is generally perpendicular to the direction of travel of the buckets. Thus, the bucket and the feed arrangement must be aligned during the process of loading a log into the bucket.

Further, logs of stacked paper products are typically void of any central core, such as in wound products like rolls of paper towels or toilet paper. The lack of a central core can reduce the rigidity of the log such that the log should be supported substantially along its entire length and not merely at the ends thereof.

By requiring a pusher element to push the logs into the buckets, the buckets and the feed arrangement need to be maintained at a constant relative position during the loading operation to prevent damaging the logs or otherwise prevent interference between the components of the buckets and the feed arrangement.

To store the logs in a space efficient manner, the accumulator typically includes a transport system that includes an endless carrier arrangement, e.g. a pair of parallel chains, that transports the buckets vertically up and down repeatedly. The buckets change vertical direction, typically, as the chains rotate about sprockets. Unfortunately, due to the change in direction, the buckets will tend to start to swing due to the acceleration/deceleration of buckets.

In the past, the entire system of buckets was stopped while an individual bucket was loaded. The system was then indexed to the next bucket for loading and then stopped again. However, the acceleration and deceleration of the system due to stopping and starting of the system amplifies the magnitude of the swinging of the buckets.

If the magnitude of the swinging is too severe, the swinging buckets can cause damage to the accumulator or cause the product to be spilled from the buckets.

As a result of above, the speed/throughput of prior accumulators has been limited. Modern upstream/downstream equipment could operate at higher speeds if accumulator speed could be similarly increased.

In prior approaches, however, running the accumulator at higher speed to increase throughput of logs through the accumulator by merely increasing speed of the chain through the accumulator will increase the acceleration/deceleration of the buckets as they traverse the changes in direction. This will thus result in increased swinging. This amplified swinging is then amplified again by the acceleration and deceleration of the system during the loading process. Further, as the chains must be accelerated to the now faster speeds, the magnitude of acceleration or period of acceleration from a dead stop to top speed must be increased further amplifying the swinging problem.

The present invention provides improvements over the art that permits faster throughput through an accumulator while preventing or reducing increases in swinging magnitude of the buckets.

BRIEF SUMMARY OF THE INVENTION

In one aspect, the invention provides a new and improved accumulator for elongated logs of products that permits increased log throughput speeds. More particularly, in one embodiment, the invention provides an accumulator that matches the motion of a bucket for carrying a log through the accumulator with the motion of a feed arrangement for loading the logs into the bucket for an extend period of time. By matching the motion of the bucket carrying the log with the motion of the feed arrangement, the detrimental accelerations and decelerations can be substantially eliminated or confined to a discrete location so that all of the buckets in the system are not repeatedly being accelerated from a dead stop to top speed. In these discrete locations, fixed position guides can be used to prevent swinging of the buckets.

The invention is not limited to paper products and could apply to other medias such as, in non-limiting fashion, plastic films, fabrics, non-wovens, paper, tissues, etc.

In one particular embodiment, a log accumulator comprising a plurality of buckets, a feed arrangement and a transport system is provided. The feed arrangement loads logs onto the buckets. The transport system transports the buckets past the feed arrangement for loading of the buckets. The transport system and the feed arrangement are configured to maintain the feed arrangement in a fixed relative position with one of the buckets for an extended period of time while the feed arrangement loads the one of the buckets.

In a more particular embodiment, the transport system includes a continuously moving region in which buckets therein are maintained in continuous motion relative to a mechanical ground, at least during the loading operation. As such, the system does not or at least all of the buckets do not come to a complete rest while each bucket is being loaded.

In one embodiment, the transport system includes a loading region adjacent the feed arrangement. The buckets are loaded by the feed arrangement when in the loading region. The loading portion is configured to stop a bucket within the loading region relative to a mechanical ground while being loaded with a log. The bucket stops for an extended period of time to permit the loading process of sliding the log into the bucket. As used herein "extended period of time" shall be greater than a brief instant For example, an extended period of time shall not include when two objects pass one another moving in opposite directions, such as at constant speeds such that the magnitude in rate of change in relative position of the two objects never changes, and is non-zero.

Unless otherwise identified, a "substantially fixed relative position" as used herein can allow for some minor relative displacement. As such, insignificant displacement between a feed arrangement and a bucket that does not affect the process of loading the log into the bucket during a process of loading shall still be considered "substantially fixed relative position." For example, a relative displacement of about one-eighth (⅛) of an inch during the loading process between a bucket and the feed arrangement shall still be considered "substantially fixed relative position."

In some embodiments, the extended period of time shall be a sufficient length of time to load a log into a bucket. In one embodiment, this length of time is between about 500 and 700 milliseconds and more preferably between about 550 and 650 milliseconds.

In one embodiment, the loading region is configured to oscillate back and forth along an oscillation axis. In a more particular embodiment, the loading region oscillates back and forth vertically. The feed arrangement may be configured to load a log into a bucket along a load or feed direction that is generally perpendicular to the oscillation axis.

Typically, the oscillations of the loading region will be generally linear. In a further embodiment, the buckets are transported along a bucket travel path through the loading region generally parallel to the oscillation axis in a bucket travel direction.

In one embodiment, the transport system includes an endless support which may be in the form of a belt to which the plurality of buckets are attached as the buckets pass through the loading region. The loading region includes an inlet belt guide and an outlet belt guide that guide the belt. The inlet and outlet belt guides are in fixed spaced relation to one another along the oscillation axis during operation. The inlet and outlet belt guides could be in the form of rotating guides such as sprockets, sheaves, wheels, etc. In one embodiment, the belt takes the form of a chain. The inlet and outlet belt guides oscillate along the oscillation axis to oscillate the loading region. The loading region is generally defined by the inlet and outlet belt guides. In alternative embodiments, the inlet and outlet belt guides could be fixed position guides.

In one embodiment, the belt continuously moves relative to the inlet and outlet belt guides in a belt travel direction extending from the inlet belt guide to the outlet belt guide, during the loading operation.

In one embodiment, the feed arrangement loads a log into a bucket when the inlet and outlet belt guides are traveling relative to mechanical ground in a direction opposite the belt travels between the inlet and outlet belt guides through the loading region. In a more particular embodiment, the feed arrangement remains in a fixed position relative to mechanical ground during the loading operation.

In one embodiment, the loading region oscillates generally parallel to the bucket travel path between traveling in a first direction generally corresponding to a bucket travel direction and traveling in a second direction generally opposite the bucket travel direction. The feed arrangement loads a bucket when the loading region is traveling in the second direction.

In one embodiment, the buckets travel along the bucket travel path between the loading region inlet and loading region outlet at a first speed. The loading region travels in the second direction at the first speed while the feed arrangement is loading the bucket. As such, the buckets become substantially fixed relative to mechanical ground.

In one embodiment, the accumulator includes a guide unit guiding the belt through the loading region. The feed arrangement and guide unit oscillate relative to one another so as to fix the position of the bucket relative to the feed arrangement while logs are being loaded into buckets.

In one embodiment, the guide unit is fixed relative to mechanical ground and the feed arrangement moves relative to mechanical ground and the fixed guide unit.

In another embodiment, the guide unit oscillates relative to mechanical ground and the feed arrangement is fixed relative to the mechanical ground.

The guide unit may include the inlet and outlet belt guides. The guide unit may include rotating guide elements, such as sprockets or pulleys.

In one embodiment, the feed arrangement oscillates generally parallel to a bucket travel path between traveling generally in a bucket travel direction and traveling generally opposite the bucket travel direction; and the feed arrangement loads a bucket when the feed arrangement is traveling relative to mechanical ground in the bucket travel direction.

In one embodiment, the buckets travel along the bucket travel path at a first speed and the feed arrangement travels in the bucket travel direction at the first speed while the feed arrangement is loading the bucket.

In one embodiment, the transport system includes an endless carrier element guided by a loading region guide structure, the feed arrangement and loading region guide structure oscillating relative to one another.

In one embodiment, when buckets are being loaded with logs, the endless carrier element is continuously moving relative to the loading region guide structure.

In a more particular embodiment, the logs are slid laterally into the buckets rather than rolled into the buckets. Also, in one embodiment, the logs are flat on at least one side.

Methods of loading logs into an accumulator are also provided. The accumulator generally includes a plurality of buckets. The accumulator also includes a feed arrangement for loading logs into the buckets. The method comprising the step of loading a log into a first one of the buckets and the step of maintaining the feed arrangement at a fixed position relative to the first one of the buckets for an extended period of time during the step of loading.

In one more particular implementation of the method, the accumulator includes a transport system including a loading region adjacent the feed arrangement. The method further including the steps of: transporting the buckets through the loading region along a bucket travel path in a bucket travel direction; wherein the step of maintaining the feed arrangement at a fixed position includes oscillating the loading region relative to the feed arrangement generally parallel to the bucket travel path; and wherein the step of loading occurs when the loading region is traveling generally opposite the bucket travel direction for an extended period of time. Where an extended period of time is a sufficient length of time to load a log into a bucket.

In a further method, the method further including the steps of: transporting the buckets through the loading region along a bucket travel path in a bucket travel direction; wherein the step of maintaining the feed arrangement at fixed position includes oscillating the loading region relative to the feed arrangement generally parallel to the bucket travel path; and wherein the step of loading occurs when the loading region is moving in the bucket travel direction.

In one method, the accumulator includes a transport system including a loading region adjacent the feed arrangement and an endless carrier element to which the buckets are attaché. The transport system further includes a loading region guide structure that guides the endless carrier element through the loading region. The step of maintaining the feed arrangement at a fixed position includes oscillating the loading region guide structure relative to the feed arrangement along an oscillation axis.

In a more particular implementation of the method, the oscillation axis is generally parallel to a bucket path that the buckets travel along during the step of loading.

In one embodiment, the accumulator includes an unload arrangement that operates on the same principles as outlined above for the feed arrangement discussed above. As such, in one embodiment, a log accumulator including a plurality of buckets, an unload arrangement, and a transport system is provided. The unload arrangement for unloads logs from the buckets. The transport system transports the buckets past the unload arrangement for unloading of the buckets. The transport system and the unload arrangement are configured to maintain the unload arrangement in a fixed relative position with one of the buckets for an extended period of time while the unload arrangement unloads the one of the buckets. The transport system includes a continuously moving region in which buckets therein are maintained in continuous motion relative to a mechanical ground.

In a further embodiment, the log accumulator includes a plurality of buckets, an unload arrangement and a transport system. The unload arrangement unloads logs from the buckets. The transport system includes an unloading region adjacent the unload arrangement. The transport system transports the buckets past the unload arrangement through the unloading region along an unload bucket travel path. The unload arrangement and unloading region oscillate relative to one another generally parallel to the unload bucket travel path. Thus, these additional embodiments provide for the benefit of not needing to stop any endless support element carrying the buckets during the unloading process just like discussed above for the loading process.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 3-7 are simplified schematic sequential illustrations of the loading region of the accumulator of FIG. 1 illustrating a log being loaded into a bucket of the accumulator;

FIGS. 10-15 are simplified schematic sequential illustrations of the loading region of an accumulator according to another embodiment of the invention illustrating a log being loaded into a bucket of the accumulator.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
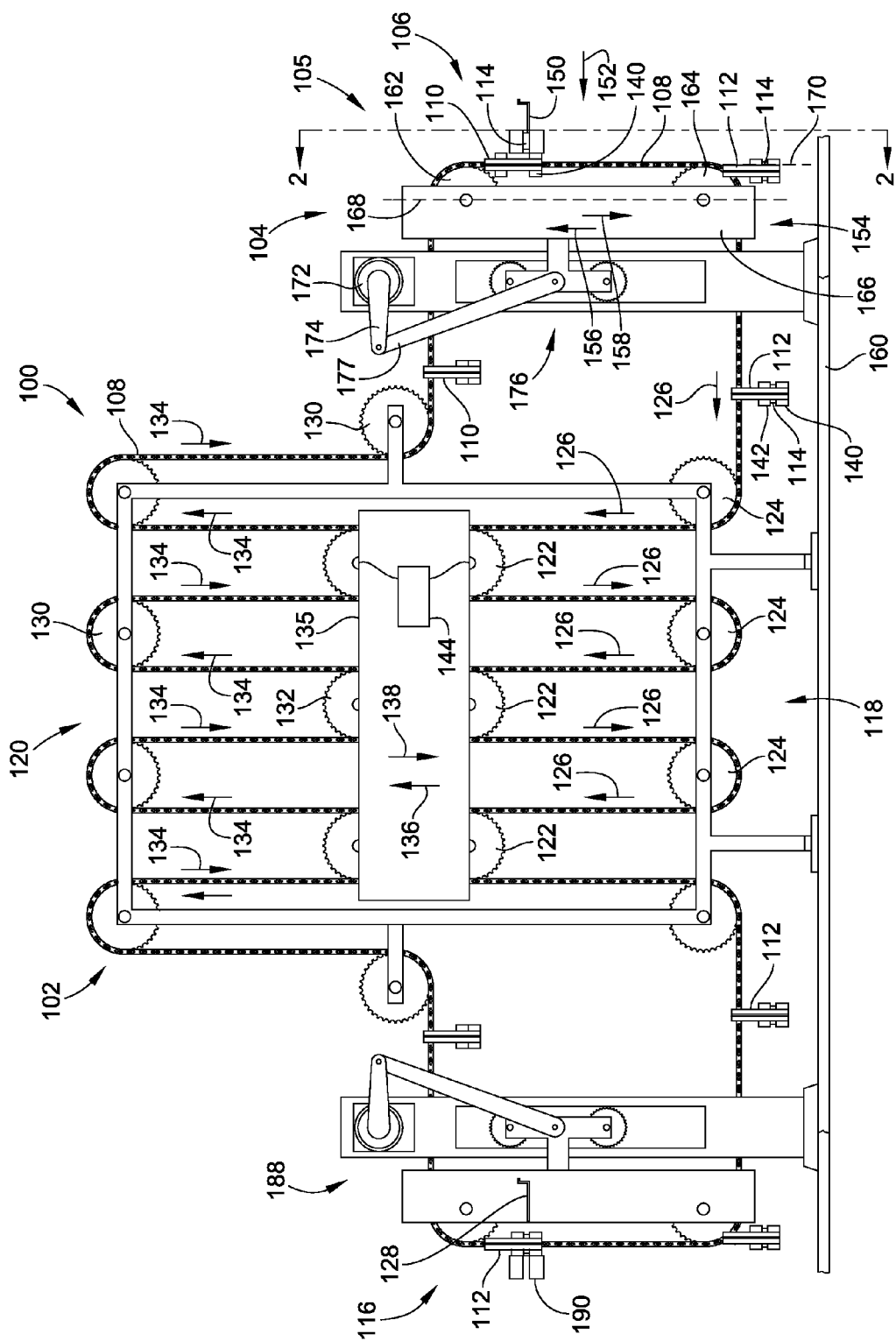
FIG. 1 is a simplified schematic side view illustration of an accumulator according to an embodiment of the invention.

FIG. 1 is a schematic simplified illustration of a log accumulator 100 (also referred to herein as "accumulator 100") according to an embodiment of the present invention. The accumulator 100 may find particular applicability for use large paper product manufacturing systems that form elongated logs of paper products. The elongated logs are then typically reduced into shorter lengths for packaging as a consumer product. For instance, these paper products could include such products as interfolded paper products (e.g. facial tissues or stacked paper towels) or rolled paper products (e.g. toilet paper or rolled paper towels).

As noted previously, the accumulator 100 is used to provide a buffer between upstream and downstream operations by allowing for accumulation of logs such that if a downstream system (e.g. the saw that cut the logs into smaller pieces) were to experience downtime, the upstream system (such as the inter-folder) would be able to continue to operate without needing to stop as well. The alternative is true as well. The accumulator 100 can store logs produced from the upstream system such that if the upstream system were to need downtime for a period of time, the downstream system would still have a supply of logs to process without requiring downtime of the downstream system as well.

The accumulator 100 generally includes a transport system that, in the illustrated embodiment includes a storage unit 102 and a loading unit 104. The storage unit 102, which establishes in this embodiment a storage region, accumulates logs and stores the logs to provide the buffer. The accumulator 100 also includes loading unit 104, which establishes in this embodiment a loading region 105, where logs are loaded into the accumulator 100 by a feed arrangement 106.

The transport system of the accumulator 100 includes an endless support element 108 that carries a plurality of buckets 110, 112. The buckets 110, 112 carry the logs through the accumulator 100. In FIG. 1, empty buckets are identified with reference number 110 and loaded buckets that include a log 114 carried thereby are identified with reference number 112.

The endless support element 108 is typically a pair of spaced apart flexible support elements in the form of belts. The belts may take more specific forms such as chains. The endless support element 108 may thus also be referred to herein as "chain 108." The chain 108 will typically be referred to in singular form herein after, however it will be understood that discussion of the operation of one chain 108 generally relates to the operation of both chains. Alternatively, the belt could be a rubber or metal band or belt, all of which are to be considered examples of an "endless support element" and more particularly a "belt."

Loaded buckets 112 are unloaded at an unload region 116.

The storage unit 102 has a loaded bucket region 118 and an unloaded bucket region 120, which are generally defined between the unload region 116 and the loading region 105. Empty buckets 110 are loaded as they pass through loading unit 104. The loaded buckets 112 are then carried by chain 108 through a plurality of movable sprockets 122 and fixed sprockets 124, which substantially define the loaded bucket region 118, toward unload region 116. In the illustrated embodiment, this movement is illustrated by arrows 126.

Once the loaded buckets 112 are emptied at the unload region 116 by unloader 128, the buckets convert to unloaded buckets 110 and travel through the unloaded bucket region 120 toward the loading region 105 to repeat the cycle.

The unloaded bucket region 120 includes a plurality of fixed position sprockets 130 and movable sprockets 132 as well that guide the chain 108 through the unloaded bucket region 120 from the unloader 128 to loading unit 104, as illustrated by arrows 134.

The storage unit 102 can adjust the amount of logs 114 that can be stored therein by adjusting the position of the adjustable sprockets 122, 132 relative to the corresponding fixed position sprockets 124, 130. The movable sprockets 122, 132 are rotatably carried by movable carrier 135 for coordinated vertical motion.

When the movable carrier 135 moves toward fixed sprockets 130 and away from fixed sprockets 124, illustrated by arrow 136, the amount of chain 108 within the loaded bucket region 118 increases. This increases the number of buckets traveling from the loading unit 104 and the unloader 128 thereby increasing the storage capacity of the loaded region. This motion simultaneously decreases the amount of chain 108 (and buckets carried thereby) within the unloaded bucket region 120.

This adjustment in position of movable carrier would occur, for example, in the instance if a downstream system were to breakdown and it was undesirable to stop an upstream system. The capacity of the loaded bucket region 118 would be increased to prevent product from being dispensed from the accumulator 100. As the capacity is increased, no logs would be dispensed from the accumulator, instead the new logs that are being loaded into the accumulator would merely be absorbed into the increasing storage capacity of the loaded bucket region. 118.

When the movable carrier 135 moves in the opposite direction, i.e. toward fixed sprockets 124 and away from fixed sprockets 130, illustrated by arrow 138, the amount of chain 108 within the unloaded bucket region 120 increases. This motion simultaneously decreases the amount of chain 108 (and buckets carried thereby) within the loaded bucket region 118. More particularly, this decreases the number of buckets traveling from the loading unit 104 toward the unloader 128 thereby decreasing the storage capacity of the loaded region.

This adjustment in position of movable carrier 135 would occur, for example, in the instance if an upstream system were to breakdown and it was undesirable to stop a downstream system. As product is dispensed, the capacity of the loaded bucket region 118 would be decreased to prevent starving the downstream system. As the capacity is decreased, no logs would be loaded into the accumulator 100. This decrease in capacity of the loaded region prevents a gap in the flow of logs 114 from occurring while no new logs are being loaded into the accumulator 100 but allows for logs 114 to be continuously dispensed from the accumulator 100. With this motion, the potential gap between logs due to upstream downtime is absorbed, effectively, by the accumulator 100.

Movable carrier 135 also allows the accumulator 100 to load logs 114 into the accumulator at a different rate than they are being unloaded. For instance, as movable carrier 135 moves vertically downward while logs are still being loaded into the accumulator, logs 114 must be unloaded from the accumulator at a faster rate than they are being loaded. This is because the volume of the loaded bucket region 118 is shrinking. In some instances, logs 114 are unloaded from the accumulator 100 at unload region 116 at a rate of up to ten percent faster than logs are being loaded into the accumulator 100 at loading region 105.

Because the chain 108 changes direction of travel when the chain 108 is guided by guide elements, e.g. sprockets 122, 124, 130, 132, the buckets 110, 112 are hingedly coupled to the chain 108 for rotation in a manner that allows the buckets 110, 112 to always hang in a constant orientation under the force of gravity. This prevents the loaded buckets 112 from tipping and dumping logs 114 from the carrier plate 140 of the buckets. The buckets can include a moveable lid 142 that rests on top of the log 112 sandwiching the log 114 between the lid 142 and carrier plate 140 to prevent the logs 114 (or portions thereof such as top layers of stacked paper products) from being dumped or otherwise prematurely expelled from the buckets 112. The lid also keeps the top sheet of the log 114 from blowing around when using light weight material such as facial tissues. In some embodiments, the lid 142 could entirely cover the entire log 114 even though in the illustrated embodiment, the lid 142 is merely a plate that rests on top of the log 114.

Because the buckets are hingedly coupled to chain 108, acceleration and particularly horizontal acceleration, which shall be used to refer to a direction perpendicular to gravity herein, of the buckets can cause the buckets to swing about the hinged connection to the chain 108. This swinging is undesirable if it becomes too great because the swinging can cause the loaded buckets 112 to dump the logs 114 carried thereby. Additionally, the swinging, if it becomes too great, of any of the buckets 110, 112 can cause the buckets to bang into various components of the accumulator which can cause damage to the components struck by the buckets, to the buckets themselves, or to the drive mechanism 144 operably driving the chain 108.

As discussed above in the background section, the swinging can be introduced in the system as the chain 108 passes over the sprockets 122, 124, 130, 132. Additionally, the swinging could have been introduced by the repeated acceleration/deceleration during prior systems loading and unloading operations which required the entire chain 108 to come to rest during loading and unloading operations.

Figure 2:
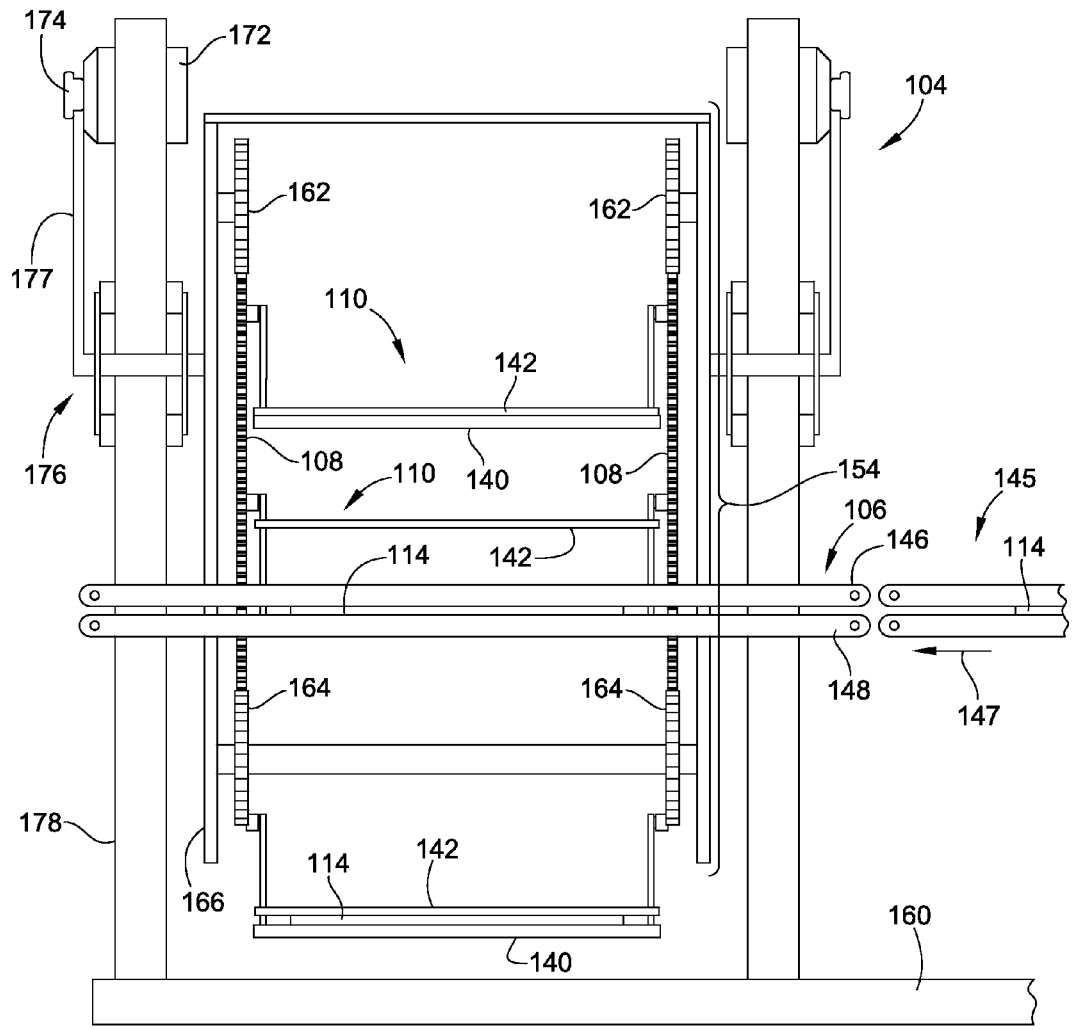
FIG. 2 is a partial end view illustration of the loading region of the accumulator of FIG. 1.

With reference to FIGS. 1 and 2, the logs 114 are loaded into the buckets at loading unit 104 by feed arrangement 106. The logs 114 are carried laterally inward from an upstream system along a conveyor system 145 in a longitudinal orientation, as illustrated by arrow 147 in FIG. 2.

The feed arrangement 106 is illustrated schematically in FIG. 1 as including a top conveyor 146 spaced vertically above a bottom conveyor 148. The logs 114 are fed laterally therebetween until the logs 114 are positioned in front of loading unit 104. As illustrated in FIG. 1, the feed arrangement 106 includes a pusher element 150 that horizontally pushes a log 114 off of the bottom conveyor 148 and into an empty bucket 110. More particularly, the log is pushed laterally, illustrated by arrow 152, by pusher element 150 onto carrier plate 140.

The loading unit 104 may include a loading unit backstop that prevent the buckets from swinging as the pusher element 150 pushes the log into bucket 110 during loading. Additionally, the loading unit may include fixed vertical guides between which the buckets pass to reduce swinging of the buckets within the loading region 105.

During loading, the lid 142 of the bucket 110 being loaded is preferably spaced well above carrier plate 140 such that it does not interfere with loading log 114 into bucket 110. A lifting arrangement, such as a servo lid lifter can be used to open the lid 142. Such a servo lid lifter could include one or more fingers that are carried by an endless support element. The one or more fingers catch the lid and maintain the lid 142 spaced apart from the carrier plate 140 during the loading operation. After loading, the fingers are accelerated relative to the bucket such that the lid 142 is set on top of the log 114. Servo lid lifters use a servo motor and are preferred as servo motors allow for improved control of the operation and movement of the fingers relative to the bucket lids 142. Typically, the fingers will be driven by the endless support element in the same direction of travel as the buckets. The rate at which they are driven is adjusted to selectively engage and disengage the lids 142 to raise and lower the lids relative to the carrier plate 140.

Further, top conveyor 146 is preferably vertically movable relative to bottom conveyor 148. When a log is being dispensed from between the top and bottom conveyors 146, 148 the two conveyors 146, 148 can be spaced apart from one another to prevent interference by the top conveyor 148. Once the log 114 is pushed onto the cooperating bucket 110, the two conveyors 146, 148 can be brought back toward one another and the next log 114 in the sequence can be indexed in front of the loading unit 104 to be loaded onto the next empty bucket 110.

After the buckets 110 have been loaded, the buckets become loaded buckets 112. As can be seen in FIGS. 1 and 2, in the loaded state, the lid 142 rests on top of log 114.

As noted previously, to increase the speed/throughput of the logs 114 through the accumulator 100, the chain 108 could not merely be exposed to faster speed and accelerations. High rates of speed and acceleration cause undesirable swinging of the buckets 110, 112. Additionally, for rectangular logs, such as for stacked and/or interfolded paper products, rather than for rolled paper products, the feed arrangement 106 and the carrier plate 140 must remain at a fixed position relative to one another while the pusher element 150 pushes the log 114 into the bucket 110.

Therefore, to reduce or eliminate the effects of stopping and starting all of the buckets 110, 112 in the accumulator 100 during loading operations, the accumulator 100 synchronizes the position of only the buckets 110 within the loading region 105 with the feed arrangement 106 for loading purposes.

More particularly, in this embodiment, the loading process does not affect the motion of the buckets 110 in the storage unit 102. During normal operation, when a log 114 is being loaded into bucket 110, the buckets 110, 112 within the storage unit 102 move at a constant speed relative to the support structure (i.e. the frame and sprockets that guide and carry chain 108) of the storage unit 102. Again, these buckets in the storage unit 102 are not exposed to the repeated starting and stopping operation that prior accumulators experienced.

Alternatively, the accumulator 100 can be seen as maintaining the chain 108 in continuous motion through the accumulator. More particularly, the chain 108 is maintained in continuous motion relative to the support structure of the accumulator 100. The support structure of the accumulator 100 includes the frame members that are attached to the mechanical ground 160 as well as the chain guides, such as sprockets, pulley, sheaves, etc. such as sprockets 122, 124, 130, 132, 162, 164 that guide the chain 108 as the chain 108 travels through the accumulator. As such, the drive mechanism 144 that drives the chain 108 is continuously driving the chain 108 at all times, even during the loading and unloading operations. In a preferred embodiment, during normal operation, the continuous motion through the accumulator is at a constant rate. As used herein, continuous motion at a constant rate shall mean that the chain is driven through at least one portion of the accumulator at a constant speed, during normal operation. As such, in some embodiments, the chain does not stop moving relative to the support structure during the loading or unloading process.

This is unlike prior accumulators where the chain was completely stopped relative to the support structure thereof during the loading and unloading operations.

To maintain the position of a bucket 110 relative to the feed arrangement 106 during a loading operation, the loading unit 104 includes an oscillating guide unit 154 that oscillates vertically up and down, as illustrated by arrows 156, 158 relative to mechanical ground 160.

The oscillating guide unit 154, in the illustrated embodiment, includes a pair of guide elements in the form of vertically spaced apart rotating sprockets 162, 164. The guide elements could take the form of fixed position guide elements in other embodiments. The oscillating guide unit 154 forms part of the support frame of the accumulator 100.

The sprockets 162, 164 are attached to a support frame 166 to fix the sprockets 162, 164 together into a unit and to fix the spacing therebetween.

The oscillating guide unit 154 oscillates vertically up and down generally along an oscillation axis 168 that is generally parallel to a bucket travel path the buckets 110 travel along through the loading region 105 during the loading process.

In general, the top sprocket 162 defines a loading region inlet and the bottom sprocket 164 defines a loading region outlet. As such, the buckets 110, 112 will travel vertically downward thorough the loading region 105, in the illustrated embodiment. More particularly, the chain 108 defines the bucket travel path along which the buckets 110, 112 are transported through the loading region 105.

By configuring the oscillating guide unit 154 for movement relative to mechanical ground 160, and consequently the rest of the accumulator 100 including the storage unit 102, the chain 108 can be driven at a continuous speed relative to the guide system guiding the chain 108 through the accumulator 100, while permitting a bucket 110 to be stopped relative to the feed arrangement 106 during the loading process. Again, this reduces the possibility for amplifying any swinging in the buckets in the storage unit 102 as the motion of those buckets 110, 112 is not affected.

Typically, between about 3 and 10 buckets will be in the loading region 105 at a time.

As noted above, the loading region 105 includes fixed position vertical guides for guiding the buckets as the buckets travel through the loading region 105. Further, fixed curved guides may be positioned adjacent the top and bottom sprockets 162, 164 to reduce swinging of the buckets as the buckets travel angularly around top and bottom sprockets 162, 164 as the buckets enter and exit the loading region 105.

The combination of the vertical guides and the curved guides prevent swinging due to the greater acceleration applied to the buckets within the loading region due to the oscillating motion of the loading unit 104 during the loading operations.

With additional reference to the simplified progressive illustrations in FIGS. 3-7, the schematic illustration of FIG. 8 and the graph of FIG. 9, the loading process will be described. Notably, in FIG. 9, the solid line represents the position of a bucket relative to the mechanical ground 160 during and subsequent to the loading process and the dashed line represents the vertical position of the oscillating guide unit 154 during and subsequent to the loading process.

In this embodiment, the vertical position of the feed arrangement 106 is fixed relative to the world, i.e. mechanical ground 160, illustrated by a constant distance D1. However, the distance between mechanical ground 160 and the oscillating guide unit 154 substantially continuously varies as the oscillating guide unit 154 oscillates up and down along oscillation axis 168. At all times, the chain 108 travels through the loading region 105 relative to the oscillating guide unit 154 in the vertically downward direction along a bucket travel path defined by chain 108 in a bucket travel direction illustrated as arrow 170.

Figure 9:
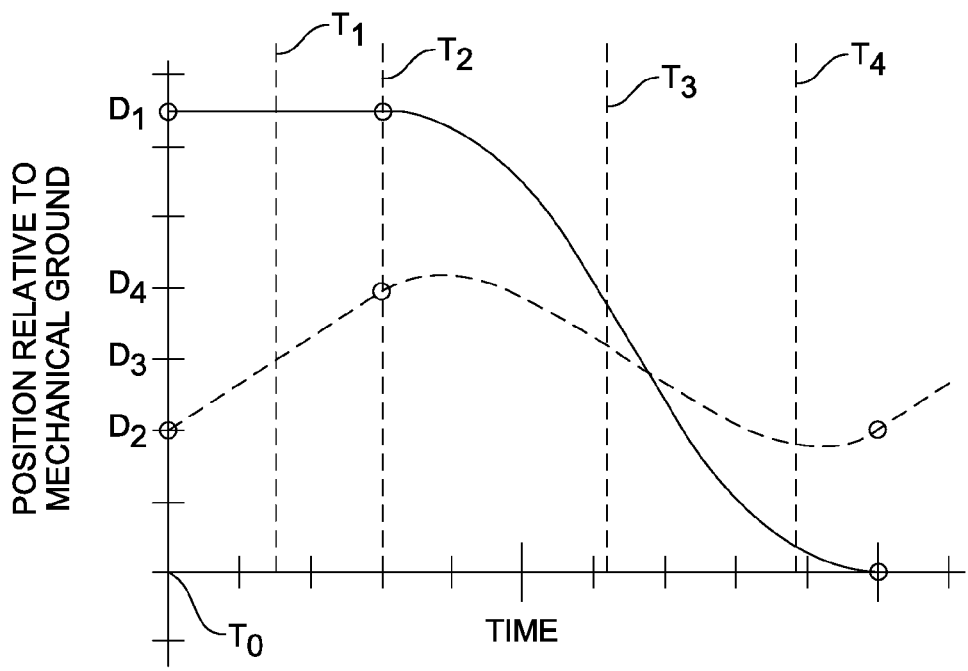
FIG. 9 is a simplified graph of the absolute position of the bucket and the guide unit of the accumulator of FIG. 1 as the bucket is being loaded with a log.

With reference to FIG. 3, the loading process is just beginning and is marked with a time T0 in FIG. 9. The feed arrangement 106 and carrier plate 140 of bucket 110 are at a substantial equal vertical position. The oscillating guide unit 154 is in a low position wherein the distance D2 between the guide oscillating guide unit 154 and the mechanical ground is near, if not at, its minimum value.

At this point, the feed arrangement 106 is about to dispense a log 114 onto empty bucket 110. Thus, the bucket 110 must be maintained at a substantially fixed position relative to the feed arrangement to permit loading the log 114 into bucket 110. To keep the bucket 110 in a fixed vertical position relative to the feed arrangement 106, the oscillating guide unit 154 is traveling vertically upward 156 along oscillation axis 168, opposite bucket travel direction 170. Further, the oscillating guide unit 154 is traveling vertically upward at a speed that is substantially equal to the speed of the buckets 110, 112 relative to the oscillating guide unit 154. Thus, for instance, if the buckets 110, 112 are carried by chain 108 at five (5) inches per second relative to the support structure, including oscillating guide unit 154, the oscillating guide unit 154 will also be traveling five (5) inches per second relative to mechanical ground 160, albeit in the opposite direction. Thus, the motion of the buckets 110 relative to the oscillating guide unit 154 is cancelled out relative as seen from the mechanical ground 160 by moving the oscillating guide unit 154 in the opposite direction at the same speed. This results in the bucket being maintained at a fixed position relative to mechanical ground 160. This is illustrated graphically by the horizontal straight line portion of the solid line in FIG. 9.

In one embodiment, it is desired to have the accumulator 100 configured to handle a throughput of thirty (30) logs per minute. In such a configuration, the speed of the chain/buckets through the storage unit 102 is six and a half (6.5) inches per second with a bucket pitch (i.e. spacing) of thirteen (13) inches.

FIG. 4 illustrates the feed arrangement 160, and particularly pusher element 150, pushing log 114 laterally in a feed direction perpendicular to the bucket travel path into bucket 110. This is illustrated at time T1 in FIG. 9. FIG. 4 illustrates that the distance D3 between oscillating guide unit 154 and mechanical ground 160 has increased. Further, at this point the oscillating guide unit 154 is still traveling vertically upward 156 along oscillation axis 168. However, bucket 110 has remained at the same vertical position relative to mechanical ground 160.

At this time, the next log 114 to be loaded into the next empty bucket begins to be indexed between top and bottom conveyors 146, 148.

With reference to FIG. 5, the pusher element 150 is being retracted to complete the loading process. To avoid any interference between the pusher element 150 and bucket 110, which is now a loaded bucket 112, the oscillating guide unit 154 is still moving vertically upward 156 along oscillation axis 168. The distance D4 between oscillating guide unit 154 and the mechanical ground 160 is at or near its maximum. This is illustrated at time T2 in FIG. 9.

Additionally, at this time, the indexing of the next log 114 between the top and bottom conveyors 146, 148 is completed to prepare the feed arrangement 106 for the cycle to be repeated.

Figure 6:
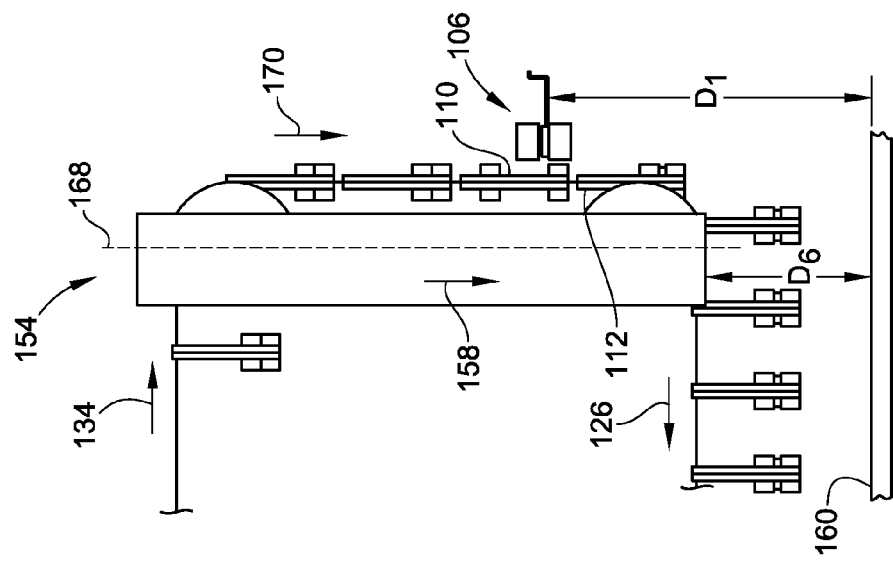

Now, the oscillating guide unit 154 must be transitioned back downward to repeat the loading sequence. As illustrated in FIG. 6, the oscillating guide unit 154 is now travelling vertically downward, illustrated as arrow 158, along oscillation axis 168. This is illustrated at time T3 in FIG. 9. Thus, unlike during the actual period where the log is being dispensed, at this point the bucket 112 (now a loaded bucket) and the oscillating guide unit 154 are traveling in a same vertical direction relative to mechanical ground 160 which causes the loaded bucket 112 to move vertically downward relative to mechanical ground 160. This is illustrated in FIG. 9 as well by the fact that the loaded bucket 112 is now moving downward relative to feed arrangement 106.

The distance D5 between the oscillating guide unit 154 and mechanical ground 160 is now reducing. Thus, at this point, distance D5 is less than distance D4.

Figure 7:
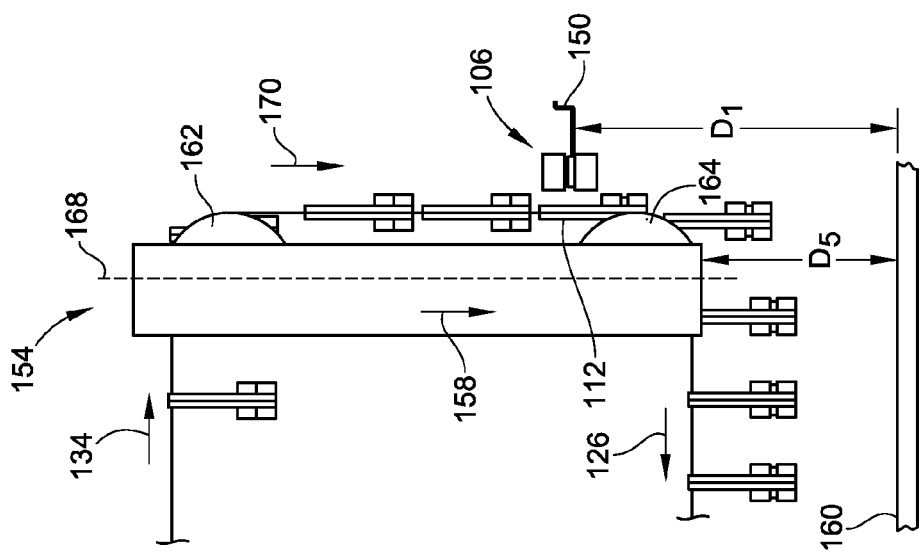

FIG. 7 is substantially identical to FIG. 3. However, at this point the oscillating guide unit 154 is traveling vertically downward 158 and will be transitioning back to moving vertically upward to maintain the new unloaded bucket 110 in a fixed vertical position relative to feed arrangement 106, as discussed previously. This is illustrated at time T4 in FIG. 9.

As can be seen in FIG. 9, during time T0 to time T2, the position of the bucket remains substantially fixed relative to mechanical ground 160 because the oscillating guide unit 154 is traveling relative to mechanical ground 160 in the opposite direction as chain 108 travels relative to the oscillating guide unit 154. Additionally, the oscillating guide unit 154 is traveling at the same speed as chain 108. However, once the oscillating guide unit 154 begins to slow down and then transition to traveling vertically downward, the bucket begins to travel vertically downward relative to mechanical ground 160.

Figure 8:
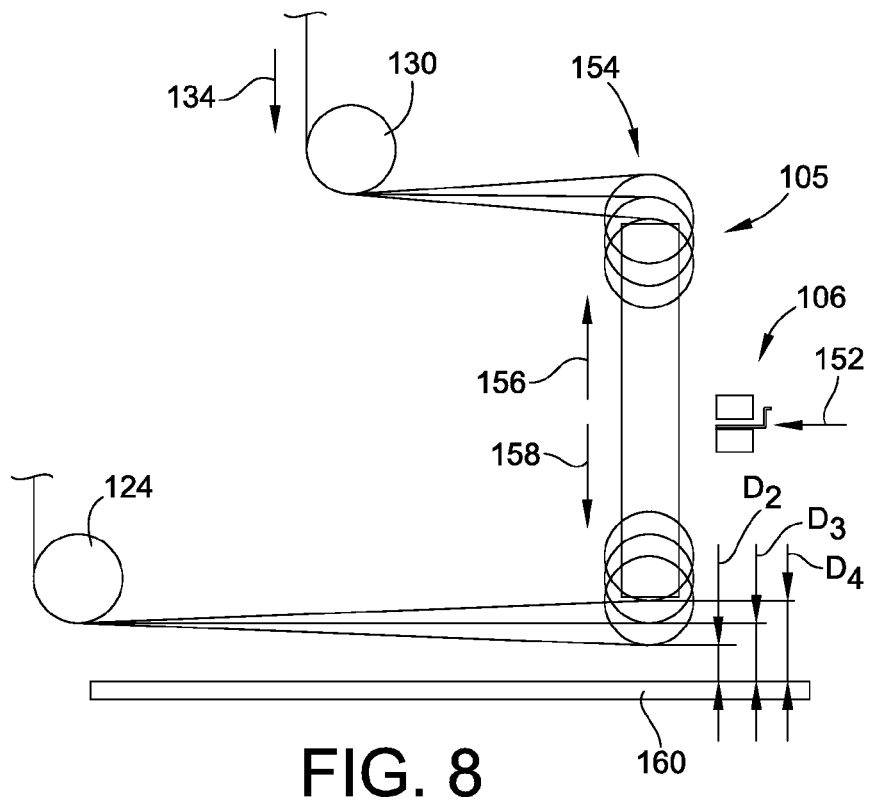
FIG. 8 is a simplified schematic illustration of the loading region of the accumulator illustrating the vertical travel of a guide unit of the accumulator.

FIG. 8 overlays the oscillating guide unit 154 in its various vertical orientations relative to mechanical ground 160 to illustrate that the portion of chain 108 upstream of the loading region inlet (i.e. sprocket 162) will transition angularly relative to the corresponding upstream fixed sprocket 130 and portion of the chain 108 downstream of the loading region outlet (i.e. sprocket 164) will transition angularly about fixed sprocket 124.

Returning to FIGS. 1 and 2, the oscillating motion of the oscillating guide unit 154 is effectuated by using an oscillating drive arrangement that includes a motor 172 driving a rotating crank shaft 174. The rotating crank shaft 174 is coupled to a linear guide 176 via a connecting rod 177. The rotation of the crank shaft 174 is translated to the linear guide 176 via the connecting rod 177 to drive the linear guide 176 vertically up and down relative to a vertical support 178. This linear guide is coupled to support frame 166 to translate the vertical motion to sprockets 162, 164.

As the motor 172 rotates, the crank shaft 174 converts the rotational motion into the vertical motion as illustrated in the graph in FIG. 9 and the various vertical positions illustrated by the sequence in FIGS. 3-7. This rotational motion creates a substantially sinusoidal oscillating motion for the oscillating guide unit 154.

Other means for linear actuation could be provided. For instance, the oscillating guide unit 154 could be driven by a linear actuator, preferably a servo linear actuator.

The motion of the oscillating guide unit 154 from time T0 to time T2 is substantially, if not entirely, constant velocity. Thus, the position of the oscillating guide unit 154 relative to mechanical ground 160 is substantially, if not entirely, linear.

The motion of the guide unit 154 from time T2 to time T4 is substantially, if not entirely, constant acceleration. Thus, the position of the oscillating guide unit 154 relative to mechanical ground 160 is substantially, if not entirely, parabolic.

To generate this motion, motor 172 is preferably a servo motor which allows for the precise control of the position and motion of the oscillating guide unit 154. More particularly, the servo motor 172, or a controller therefore, is programmed to produce the desired motion profile. This is because the motion profile is not a perfect sinusoidal profile due to the extended periods of constant velocity. The use of the servo motor allows for the complex control of the position and motion of the oscillating guide unit 154.

FIG. 2 illustrates that a pair of chains 108 are actually provided, one on each side of the buckets 110, 112. The prior discussion was discussed with reference to a single one of the chains 108 as the two chains travel in parallel in substantially identical manner.

By using this arrangement that acts to stop the motion of only the bucket(s) within the loading region 105 relative to the feed arrangement 106, the rest of the buckets 110, 112 that are in the storage unit 102 are not exposed to the significant accelerations and decelerations that can cause significant swinging of the buckets.

In one example of an accumulator 100 according to the embodiment of FIG. 1, the accumulator can load and unload 30 logs per minute. The chain 108 is driven at a constant linear speed of 6.5 inches per second. This constant speed prevents any starting and stopping of the chain 108 relative to the guide supports of the accumulator 100 to prevent amplifying any bucket swinging.

A substantially similar concept for loading the buckets with logs is illustrated schematically in FIGS. 10-15. The concept is similar in that it acts to maintain the position of the bucket 110 in a same position as feed arrangement 206 during the loading operation. However, this concept uses an oscillating feed arrangement 206 rather than oscillating guide unit 154.

In this arrangement, the chain 208 is guided by a fixed guide unit 254 through loading region 205. More particularly, the fixed guide unit 254 remains a constant distance D7 from mechanical ground 260 at all times of operation of the accumulator.

However, in this embodiment, the feed arrangement travels vertically up and down (illustrated as arrows 256, 258) relative to mechanical ground 260 and fixed guide unit 254 during the loading process to fix the position of the bucket 210 relative to the feed arrangement 206.

With reference to FIG. 10, the feed arrangement 206 and the bucket 210 are aligned with one another and are at a same vertical position relative to mechanical ground 260. The feed arrangement 260 is positioned a distance D8 relative to mechanical ground 260. In this arrangement, bucket 210 is in an unloaded state and traveling through the loading region 205 relative to fixed guide unit 254 in a bucket travel direction illustrated by arrow 270.

Similarly, the feed arrangement 206, illustrated schematically by the top and bottom conveyors 246, 248 and pusher element 250, is traveling relative to mechanical ground 260 vertically downward, illustrated as arrow 258. Thus, at this point both the bucket 210 and the feed arrangement 206 are traveling at a same speed parallel to one another and parallel to an oscillation axis 268, as well as in a same direction. By moving at the same speed in parallel fashion, the relative position of the feed arrangement 206 and the bucket 210 does not change.

At this point the feed arrangement 206 is loaded with a log 114 and is in preparation to push the log 114 into bucket 210.

FIG. 11 illustrates the feed arrangement 206 loading log 114 into bucket 210, converting the bucket to a loaded bucket 212. At this point both the bucket 212 and the feed arrangement have moved toward mechanical ground 260 and are spaced a new distance D9 therefrom. Distance D9 is less than distance D8. However, unlike in the prior embodiment, the guide unit 254 guiding chain 208 has remained at a constant position of distance D7 away from mechanical ground 260. The feed arrangement 206 and bucket 212 are moving downward illustrated by arrows 258, 270, respectively.

In FIG. 12, the pusher element 250 has retracted and a new log 114 has been loaded into the feed arrangement 206. Again, the feed arrangement 206 and bucket 212 have a common distance D10 relative to mechanical ground and are still moving in the same direction and moving toward mechanical ground 260. At this point, the feed arrangement 206 will begin to decelerate and change direction along oscillation axis 268 and the bucket 212 and feed arrangement 206 will begin to separate.

FIGS. 13 and 14 illustrate the feed arrangement traveling vertically upward, illustrated by arrow 256 and away from mechanical ground 260. At this point, the feed arrangement 206 and the bucket 212 are moving in opposite directions. In FIG. 13, the feed arrangement 206 is a distance D11 away from mechanical ground 260, which is greater than distance D10. Similarly, in FIG. 14, feed arrangement 206 is a distance D12 above mechanical ground 206, which is greater than distance D11.

While the bucket has traveled from its position in FIG. 10 to its position in FIG. 13 it has undergone no acceleration. The bucket has continued to travel at a constant speed in a constant direction through loading region 205.

FIG. 15 illustrates the feed arrangement 206 returning to its initial position illustrated in FIG. 10. The feed arrangement 206 is a distance D13 away from mechanical ground 260 which is equal to distance D8. At this point, the feed arrangement 206 will again change directions from traveling vertically upward, illustrated by arrow 256, back to traveling vertically downward, illustrated by arrow 258 as it proceeds to load the next bucket 210 in the sequence of buckets attached to chain 208.

A similar mechanism for oscillating the feed arrangement 206 vertically up and down can be used as described previously for oscillating guide arrangement 254.

The previously discussed arrangements loaded buckets as they generally traveled through the loading regions 105, 205 in a vertically downward direct orientation. However, other embodiments could reverse the direction the buckets travel through the loading regions 105, 205 during the loading operation.

Typically, an accumulator will unload buckets as the buckets travel in an opposite direction as compared to when they are being loaded. For instance, if the buckets are loaded as the buckets travel generally vertically downward as the buckets travel through the loading region, the buckets will travel vertically upward as the buckets travel through the unloading region. Alternatively, if the buckets are loaded as the buckets travel generally vertically upward as the buckets travel through the loading region, the buckets will travel vertically downward as the buckets travel through the unloading region.

With reference to FIG. 1, the concepts relating to the inventive loading arrangements where the buckets are maintained in a fixed orientation relative to the feed arrangement during loading can be incorporated into the unload region 116 and unload unit 188. Here, the buckets travel through the unload region 116 along a bucket unload path. More specifically, a similar unload unit 188 as the loading units and loading regions discussed above could be implemented to unload the logs 114 from the buckets. However, the unloader 128 is a pusher that pushes the logs 114 from the buckets 112 and onto conveyor 190 rather than pushing the logs 114 into the buckets 110. As such, an unloading arrangement may include conveyor 190 and pusher 128 much like the prior feed arrangement 106 include pusher 150 and conveyors 146, 148. The load unit 188 could be substantially similar to loading units of the prior embodiments that incorporate load unit 154 and loading unit 254.

As such, additional discussion of an unloading unit and unloading region utilizing these concepts is unnecessarily duplicative and substantially all discussion relating to the loading process and structure discussed above shall be equally applicable to the unloading process and structures.

However, it should be noted, that in some embodiments, the accumulator 100 can be configured such that the unload unit 188 is configured to run at a speed of approximately ten (10) percent faster than the loading unit 104. This is because a typical downstream operation such as a cartoner for cartooning final product will experience more downtime than the upstream folder system. Thus, when the cartoner is operational, it must operate faster than an upstream folder to make up time for the various downtime situations.

Further, the embodiments above generally describe that one of the feed arrangement 106 or the guide unit 154 remains fixed relative to mechanical ground 160 while the other one of the guide unit 154 or the feed arrangement 106 oscillates relative to mechanical ground and consequently the fixed position feed arrangement or guide unit 154. However, other embodiments could be configured such that both the feed arrangement 106 and the guide unit 154 oscillate relative to the mechanical ground 106 and generally parallel to the bucket travel path through the loading region 105. In this arrangement, the feed arrangement 106 and the guide unit 154 would travel in opposite directions, at least, when a log 114 is being pushed into a bucket 110. However, at some point in the cycle, the two devices may be traveling in the same direction to index the two devices to the proper location to start the next loading operation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A log accumulator comprising:
a plurality of buckets;
a feed arrangement for loading logs onto the buckets;
a transport system transporting the buckets past the feed arrangement for loading of the buckets;
the transport system and the feed arrangement being configured to maintain the feed arrangement in a fixed relative position with one of the buckets for an extended period of time while the feed arrangement loads the one of the buckets; and
wherein the transport system includes a continuously moving region in which buckets therein are maintained in continuous motion relative to a mechanical ground; and
wherein the transport system includes a loading region adjacent the feed arrangement, the one of the buckets is loaded by the feed arrangement when in the loading region, the loading region is configured to stop the one of the buckets within the loading region relative to a mechanical ground while being loaded with a log.

2. The log accumulator of claim 1, wherein the loading region is configured to oscillate back and forth along an oscillation axis.

3. The log accumulator of claim 2, wherein the loading region oscillates back and forth vertically.

4. The log accumulator of claim 2, wherein the feed arrangement loads the log into a bucket along a load direction that is generally perpendicular to the oscillation axis.

5. The log accumulator of claim 2, wherein the buckets are transported through the loading region generally parallel to the oscillation axis.

6. The log accumulator of claim 5, wherein the transport system includes a belt to which the plurality of buckets are attached as the buckets pass through the loading region, the loading region includes an inlet belt guide and an outlet belt guide that guide the belt, the inlet and outlet belt guides being in fixed spaced relation to one another along the oscillation axis.

7. The log accumulator of claim 6, wherein the inlet and outlet belt guides oscillate along the oscillation axis.

8. The log accumulator of claim 7, wherein the belt continuously moves relative to the inlet and outlet belt guides in a belt travel direction extending from the inlet belt guide to the outlet belt guide.

9. The log accumulator of claim 8, wherein the feed arrangement loads the one of the plurality of buckets when the inlet and outlet belt guides are traveling in a direction opposite the belt travel direction.

10. A log accumulator comprising:
a plurality of buckets;
a feed arrangement for loading logs onto the buckets;
a transport system transporting the buckets past the feed arrangement for loading of the buckets;
the transport system and the feed arrangement being configured to maintain the feed arrangement in a fixed relative position with one of the buckets for an extended period of time while the feed arrangement loads the one of the buckets; and wherein the transport system includes a continuously moving region in which buckets therein are maintained in continuous motion relative to a mechanical ground; and wherein the transport system includes a loading region adjacent the feed arrangement, the loading region includes a loading region inlet and a loading region outlet;

the transport system transports the buckets through the loading region along a bucket travel path between the loading region inlet and the loading region outlet in a bucket travel direction extending from the loading region inlet toward the loading region outlet;

the loading region oscillates generally parallel to the bucket travel path between traveling in a first direction generally corresponding to the bucket travel direction and traveling in a second direction generally opposite the bucket travel direction; and the feed arrangement loads a bucket when the loading region is traveling in the second direction.

11. The log accumulator of claim 10, wherein the buckets travel along the bucket travel path between the loading region inlet and loading region outlet at a first speed, the loading region travels in the second direction at the first speed while the feed arrangement is loading the bucket.

12. A log accumulator comprising:
a plurality of buckets;
a feed arrangement for loading logs onto the buckets;
a transport system transporting the buckets past the feed arrangement for loading of the buckets;
the transport system and the feed arrangement being configured to maintain the feed arrangement in a fixed relative position with one of the buckets for an extended period of time while the feed arrangement loads the one of the buckets; and
wherein the transport system includes a continuously moving region in which buckets therein are maintained in continuous motion relative to a mechanical ground; and
wherein the transport system includes a loading region adjacent the feed arrangement;
the transport system transports the buckets through the loading region along a bucket travel path in a bucket travel direction;
the loading region oscillates generally parallel to the bucket travel path between traveling generally in the bucket travel direction and traveling generally opposite the bucket travel direction; and
the feed arrangement loads a bucket when the loading region is traveling generally opposite the bucket travel direction.

13. The log accumulator of claim 12, wherein the buckets travel along the bucket travel path at a first speed, the loading region travels opposite the bucket travel direction at the first speed while the feed arrangement is loading the one of the buckets.

14. The log accumulator of claim 12, wherein the loading region includes an inlet belt guide and an outlet belt guide supporting a belt, the buckets affixed to the belt, the inlet and outlet belt guides being maintained in a fixed position relative to one another as the inlet and outlet belt guides oscillate generally parallel to the bucket travel path between traveling generally in the bucket travel direction and traveling generally opposite the bucket travel direction.

15. The log accumulator of claim 14, wherein the belt guides are rotating belt guides.

16. A method of loading logs into an accumulator including a plurality of buckets, the accumulator including a feed arrangement for loading logs into the buckets, the method comprising the steps of:
loading a log into a first one of the buckets;
maintaining the feed arrangement at a fixed position relative to the first one of the buckets for an extended period of time during the step of loading;
continuously moving a portion of the of buckets relative to mechanical ground during the step of loading;
wherein the accumulator includes a transport system including a loading region adjacent the feed arrangement, the method further including the steps of:
transporting the buckets through the loading region along a bucket travel path in a bucket travel direction;
wherein the step of maintaining the feed arrangement at fixed position includes oscillating the loading region relative to the feed arrangement generally parallel to the bucket travel path; and
wherein the step of loading occurs when the loading region is traveling generally opposite the bucket travel direction.

17. The method of claim 16, wherein the accumulator further includes an unload arrangement for unloading logs from the buckets, the method further comprising the steps of:
unloading a log from a second one of the buckets; and
maintaining the unload arrangement at a fixed position relative to the second one of the buckets for an extended period of time during the step of loading; and
continuously moving a portion of the plurality of buckets relative to the mechanical ground during the step of unloading.

18. A method of loading logs into an accumulator including a plurality of buckets, the accumulator including a feed arrangement for loading logs into the buckets, the method comprising the steps of:
loading a log into a first one of the buckets;
maintaining the feed arrangement at a fixed position relative to the first one of the buckets for an extended period of time during the step of loading;
continuously moving a portion of the plurality of buckets relative to a mechanical ground during the step of loading;
wherein the accumulator includes a transport system including a loading region adjacent the feed arrangement and an endless carrier element to which the buckets are attached, the transport system further including a loading region guide structure that guides the endless carrier element through the loading region, wherein the step of maintaining the feed arrangement at a fixed position includes oscillating the loading region guide structure relative to the feed arrangement along an oscillation axis.

19. The method of claim 18, wherein the oscillation axis is generally parallel to a bucket path that the buckets travel along during the step of loading.

20. A log accumulator comprising:
a plurality of buckets;
a feed arrangement for loading logs onto the buckets;
a transport system including a loading region adjacent the feed arrangement, the transport system transporting the buckets past the feed arrangement through the loading region along a bucket travel path;
wherein the feed arrangement and loading region oscillate relative to one another generally parallel to the bucket travel path;

wherein the bucket travels along the bucket travel path in a bucket travel direction relative to the loading region; and wherein the loading region oscillates relative to a mechanical ground along an oscillation axis being generally parallel to the bucket travel path and the feed arrangement remains in a substantially fixed position relative to the mechanical ground and the oscillation axis.

21. The log accumulator of claim 20, wherein the bucket travels along the bucket travel path in a bucket travel direction relative to the loading region, and wherein the feed arrangement loads a bucket when the feed arrangement is traveling relative to the loading region in the bucket travel direction, such that the feed arrangement is maintained in a substantially fixed relative position with one of the buckets for an extended period of time while the feed arrangement loads the one of the buckets.

22. The log accumulator of claim 21, wherein the bucket travels along the bucket travel path in a bucket travel direction relative to the loading region, and wherein the feed arrangement loads a bucket when the feed arrangement is traveling relative to the loading region in the bucket travel direction.

23. The log accumulator of claim 20, wherein the transport system maintains at least a portion of the buckets in continuous motion.

24. A log accumulator comprising:
a plurality of buckets;
a feed arrangement for loading logs onto the buckets;
a transport system including a loading region adjacent the feed arrangement, the transport system transporting the buckets past the feed arrangement through the loading region along a bucket travel path;
wherein the feed arrangement and loading region oscillate relative to one another generally parallel to the bucket travel path;
wherein the bucket travels along the bucket travel path in a bucket travel direction relative to the loading region; and
wherein the feed arrangement oscillates relative to a mechanical ground along an oscillation axis being generally parallel to the bucket travel path and wherein the loading region oscillates relative to the mechanical ground along an oscillation axis being generally parallel to the bucket travel path.

25. A log accumulator comprising:
a plurality of buckets;
an unload arrangement for unloading logs from the buckets;
a transport system including an unloading region adjacent the unload arrangement, the transport system transporting the buckets past the unload arrangement through the unloading region along an unload bucket travel path; and wherein the unload arrangement and unloading region oscillate relative to one another generally parallel to the unload bucket travel path; and wherein the unloading region oscillates relative to a mechanical ground along an oscillation axis being generally parallel to the unload bucket travel path and the unload arrangement remains in a substantially fixed position relative to the mechanical ground and the oscillation axis.

26. The log accumulator of claim 25, wherein the transport system maintains at least a portion of the buckets in continuous motion.

27. The log accumulator of claim 25, wherein the bucket travels along the unload bucket travel path in a bucket travel direction relative to the unloading region, and wherein the unload arrangement unloads a bucket when the unload arrangement is traveling relative to the unloading region in the bucket travel direction, such that the unload arrangement is maintained in a substantially fixed relative position with one of the buckets for an extended period of time while the unload arrangement unloads the one of the buckets.

28. The log accumulator of claim 27, wherein the bucket travels along the unload bucket travel path in a bucket travel direction relative to the unloading region, and wherein the unload arrangement unloads a bucket when the unload arrangement is traveling relative to the unloading region in the bucket travel direction.

29. A log accumulator comprising:
a plurality of buckets;
an unload arrangement for unloading logs from the buckets;
a transport system including an unloading region adjacent the unload arrangement, the transport system transporting the buckets past the unload arrangement through the unloading region along an unload bucket travel path; and
wherein the unload arrangement and unloading region oscillate relative to one another generally parallel to the unload bucket travel path; and
wherein the unload arrangement oscillates relative to a mechanical ground along an oscillation axis being generally parallel to the unload bucket travel path and wherein the unloading region oscillates relative to the mechanical ground along an oscillation axis being generally parallel to the unload bucket travel path.

* * * * *

UNITED STATES PATENT AND TRADEMARK OFFICE
CERTIFICATE OF CORRECTION

PATENT NO.         : 8,490,772 B2                                          Page 1 of 1
APPLICATION NO.    : 12/980072
DATED              : July 23, 2013
INVENTOR(S)        : James R. Michler et al.

It is certified that error appears in the above-identified patent and that said Letters Patent is hereby corrected as shown below:

In the Claims:

In column 18, line 9, the line should be corrected to read -- continuously moving a portion of the plurality of buckets relative to --.

Signed and Sealed this
Seventeenth Day of September, 2013

Teresa Stanek Rea
*Deputy Director of the United States Patent and Trademark Office*